United States Patent [19]

Leih et al.

[11] Patent Number: 5,969,630
[45] Date of Patent: *Oct. 19, 1999

[54] METHOD FOR THE DEREGISTRATION OF A USER REGISTERED AT A TERMINAL VIA REGISTRATION DATA, AND ALSO TELECOMMUNICATIONS SYSTEM

[75] Inventors: George Leih, Voorschoten; Andre Lensink, Leiden, both of Netherlands

[73] Assignee: Koninklijke PTT Nederland N.V., Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/793,064
[22] PCT Filed: Aug. 14, 1995
[86] PCT No.: PCT/EP95/03228
  § 371 Date: Feb. 14, 1997
  § 102(e) Date: Feb. 14, 1997
[87] PCT Pub. No.: WO96/06413
  PCT Pub. Date: Feb. 29, 1996

[30] Foreign Application Priority Data

Aug. 19, 1994 [NL] Netherlands ............... 9401344

[51] Int. Cl.$^6$ .................................................. G05B 23/02
[52] U.S. Cl. .................. 340/825.07; 379/89; 379/142; 364/239; 364/243
[58] Field of Search .................. 340/825.07, 825.72; 364/243, 244, 240.2, 259, 238.6, 239, 244.6, DIG. 2; 379/89, 142

[56] References Cited

U.S. PATENT DOCUMENTS

| 4,899,373 | 2/1990 | Lee et al. ................................. 379/207 |
| 4,961,217 | 10/1990 | Akiyama ................................. 379/142 |

FOREIGN PATENT DOCUMENTS

| 0123890 | 7/1984 | European Pat. Off. . |
| 0 123 890 | 11/1984 | European Pat. Off. . |
| 0 264 092 | 4/1988 | European Pat. Off. . |
| 2-105765 | 4/1990 | Japan . |
| 6-133054 | 5/1994 | Japan . |
| 2 271 912 | 4/1994 | United Kingdom . |

*Primary Examiner*—Michael Horabik
*Assistant Examiner*—Jean B. Jeanglaude
*Attorney, Agent, or Firm*—Michaelson & Wallace; Peter L. Michaelson

[57] ABSTRACT

The registration at a terminal on the basis of registration data which are stored in a terminal memory and the need to deregister oneself subsequently at the same terminal has the disadvantage that, if the deregistration is forgotten, the terminal memory is unnecessarily occupied by invalid information. This is prevented if the deregistration is performed from a further terminal, the possibilities including both an explicit deregistration and an implicit deregistration on the basis of a further registration. If the registration data are split into identification data and terminal data, more efficient use is made in that case of the terminal memory and if the identification data are split into user data and service data the possibility even arises of deregistering a user at a particular terminal for some services but not for other services.

20 Claims, 2 Drawing Sheets

METHOD FOR THE DEREGISTRATION OF A USER REGISTERED AT A TERMINAL VIA REGISTRATION DATA, AND ALSO TELECOMMUNICATIONS SYSTEM

BACKGROUND OF THE INVENTION

The invention relates to a method for deregistering a user registered at a terminal via registration data, which terminal is provided with a terminal memory in which the registration data are stored in response to identification information to be supplied, registration location data to be supplied to a network being stored in a memory field of a location memory means of the network.

Such a method is generally known and generally takes place after the user has registered himself at the terminal via registration data.

The registration takes place in the case of a not very advanced terminal, for example, by placing a smart card in the terminal, after which the terminal obtains identification information from the smart card and feeds it to the network. In response thereto, the network stores registration location data in the memory field of the location memory means. The deregistration then takes place in the abovementioned example of the not very advanced terminal by removing the smart card from the terminal, after which the terminal feeds deregistration data to the network. In response thereto, the registration location data in the memory field of the location memory means are declared invalid. If the user moves without removing his smart card from the terminal when he does so, this only has the consequence that incoming telephone calls for this user are incorrectly routed to the terminal, that user cannot register himself at another terminal without his smart card and that another user cannot register himself at the first terminal mentioned. However, the other user can, of course, remove the smart card of the first user and then register himself at the terminal, which has the consequence that incoming telephone calls for the first user mentioned are no longer routed to any terminal at all.

In the case of a more advanced terminal, the registration takes place, for example, by accessing the smart card by means of a card reader associated with the terminal, the terminal obtaining the identification information from the smart card via the card reader and storing identification data in the terminal memory. The terminal feeds the identification data to the network which, in response thereto, stores the registration location data in the memory field of the location memory means. In the example mentioned of the more advanced terminal, various users could even register at the same terminal, the identification data associated with further users also being stored in the same terminal memory. The deregistration could in this case take place by accessing the smart card again by means of the card reader associated with the terminal.

Such a method has, inter alia, the disadvantage that, if the user moves without accessing his smart card again by means of the card reader, this not only has the consequence that incoming telephone calls intended for the user are incorrectly routed to the terminal, but also that the terminal memory is unnecessarily taken up by invalid information, as a result of which other users can no longer register at the terminal at a given instant.

SUMMARY OF THE INVENTION

The object of the invention is, inter alia, to provide a method of the type stated in the introduction in which the failure by a user to deregister at a terminal at which the user had earlier registered himself does not lead, inter alia, to the abovementioned disadvantage of the capability of the terminal to become jammed as regards the registration procedures.

For this purpose, the method according to the invention has the characteristic that the method comprises the steps of the supplying of certain data to a further terminal by the user, the transmission of an information signal to the network by the further terminal in response to the certain data to be supplied, the adjustment by the network of the registration location data stored in the memory field of the location memory means in response to the information signal, the transmission of a clearing signal to the terminal, and the clearing of at least a portion of the terminal memory by the terminal in response to the clearing signal.

As a result of arranging for the user to supply the certain data to a further terminal and of arranging for the further terminal to transmit the information signal to the network, the network is able to adjust the registration location data stored in the memory field of the location memory means so that incoming telephone calls intended for the user are no longer incorrectly routed to the first terminal mentioned. The clearing of at least a portion of the terminal memory by the terminal in response to the clearing signal prevents the terminal memory unnecessarily being taken up by invalid information.

The invention is based, inter alia, on the insight that a registration associated with a first terminal ought to be capable of being rendered invalid by means of a deregistration performed from a second terminal. In this way, the problem of deregistrations not performed at more advanced terminals is solved by deregistering from other (more or less advanced) terminals. It should be pointed out in this connection that at least a portion of the inventiveness of the method according to the invention is in the posing of the abovementioned problem, the disadvantage of having both to register and deregister oneself at the same more advanced terminal being furthermore overcome by the method according to the invention.

A first embodiment of the method according to the invention has the characteristic that the registration data comprise identification data and terminal data, the identification data being stored in a first memory field of the terminal memory and the terminal data being stored in a second memory field of the terminal memory.

Under these circumstances, the registration data are separated into the identification data and the terminal data and are thus stored separately, which offers the advantage of being able to make use of the same terminal data for users characterized by different identification data. This results in a more efficient use of the terminal data.

A second embodiment of the method according to the invention has the characteristic that the registration data comprise at least identification data, the identification data comprising user data and service data, the user data being stored in a first portion of the first memory field and the service data being stored in a second portion of the first memory field.

Under these circumstances, the identification data associated with the registration data are separated into the user data and the service data and are thus stored separately, which offers the advantage of the ability to deregister, with respect to a user characterized by the user data, only certain services characterized by certain service data so that the user characterized by the user data is not registered as regards the remaining services characterized by remaining service data.

A third embodiment of the method according to the invention has the characteristic that the clearing signal comprises a first clearing subsignal for at least partially clearing the first portion of the first memory field and/or comprises a second clearing subsignal for at least partially clearing the second portion of the first memory field.

As a result of this, it is possible to arrange which user data are and which user data are not declared invalid and/or which service data are and which service data are not declared invalid.

A fourth embodiment of the method according to the invention has the characteristic that the method step of adjusting the registration location data takes place by replacing at least a part of the registration location data by at least a part of further registration location data to be generated in response to the further information signal.

In this case, a further registration takes place at the further terminal so that incoming telephone calls intended for the user are routed to the further terminal.

A fifth embodiment of the method according to the invention has the characteristic that the certain data comprise registration information and the method step of transmitting the clearing signal takes place in response to the adjustment of the registration location data.

Under these circumstances, the further registration causes the deregistration so that it is possible to speak of an implicit deregistration.

A sixth embodiment of the method according to the invention has the characteristic that the certain data comprise registration information and clearing information, and the method step of transmitting the clearing signal takes place in response to the supplying of the clearing information.

Under these circumstances, in addition to the further registration, a deregistration takes place so that it is possible to speak of an explicit deregistration performed from the further terminal.

A seventh embodiment of the method according to the invention has the characteristic that the method step of adjusting the registration location data takes place by declaring at least a part of the registration location data invalid.

In this case, no further registration takes place at the further terminal so that incoming telephone calls intended for the user are not routed to the further terminal and are no longer routed to the first terminal mentioned.

An eighth embodiment of the method according to the invention has the characteristic that the certain data comprise clearing information, and the method step of transmitting the clearing signal takes place in response to the adjustment of the registration location data.

Under these circumstances, a deregistration takes place without the further registration so that it is possible to speak of an explicit deregistration performed from the network.

A ninth embodiment of the method according to the invention has the characteristic that the certain data comprise clearing information, and the method step of transmitting the clearing signal takes place in response to the supplying of the clearing information.

Under these circumstances, a deregistration takes place without the further registration so that it is possible to speak of an explicit deregistration performed from the further terminal.

The invention furthermore relates to a telecommunication system comprising a first terminal and a second terminal and a network situated between the first terminal and the second terminal, which first terminal is provided with a terminal memory for storing registration data for registering a user in response to identification information to be supplied, which first terminal is furthermore provided with transmitting means for transmitting, in response to the identification information to be supplied, an information signal to the network, which is provided with location memory means for storing registration location data in a memory field of the location memory means in response to the information signal.

The object of the invention is furthermore to provide, inter alia, a telecommunication system of the type stated above in which the failure by a user to deregister at a terminal at which the user had earlier registered himself does not result, inter alia, in the abovementioned disadvantage of the capability of the terminal becoming jammed as regards the registration procedures.

For this purpose, the telecommunication system according to the invention has the characteristic that the second terminal is provided with further transmitting means for transmitting, in response to certain data to be supplied to the second terminal, a further information signal, the network being provided with adjustment means for adjusting, in response to the further information signal, registration location data already stored in the memory field of the location memory means, the telecommunication system being provided with yet further transmitting means for transmitting, as a consequence of the supplying of the certain data to the second terminal, a clearing signal to the first terminal for clearing at least a portion of the terminal memory.

As a result of transmitting the information signal to the network in response to certain data to be supplied by the user to the further terminal via the further transmitting means, and adjusting, in response to the information signal, the registration location data stored in the memory field of the location memory means via the adjustment means, incoming telephone calls intended for the user are no longer routed incorrectly to the first terminal mentioned. The transmission, via the yet further transmitting means (which are situated either in the further terminal or in the network), of the clearing signal to the terminal, which clears at least a portion of the terminal memory in response to the clearing signal, prevents the terminal memory unnecessarily being taken up by invalid information.

A first embodiment of the telecommunication system according to the invention has the characteristic that the registration data comprise identification data and terminal data, the identification data being stored in a first memory field of the terminal memory and the terminal data being stored in a second memory field of the terminal memory.

A second embodiment of the telecommunication system according to the invention has the characteristic that the registration data comprise at least identification data, the identification data comprising user data and service data, the user data being stored in a first portion of the first memory field and the service data being stored in a second portion of the first memory field.

A third embodiment of the telecommunication system according to the invention has the characteristic that the clearing signal comprises a first clearing subsignal for at least partially clearing the first portion of the first memory field and/or comprises a second clearing subsignal for at least partially clearing the second portion of the first memory field.

A fourth embodiment of the telecommunication system according to the invention has the characteristic that the adjustment means are provided with replacement means for replacing at least a part of the registration location data by at least a part of further registration location data to be generated in response to the further information signal.

A fifth embodiment of the telecommunication system according to the invention has the characteristic that the certain data comprise registration information, the yet further transmitting means transmitting the clearing signal to the first terminal under the control of the adjustment means.

A sixth embodiment of the telecommunication system according to the invention has the characteristic that the certain data comprise registration information and clearing information, the yet further transmitting means transmitting the clearing signal to the first terminal in response to the further information signal originating from the further transmitting means of the second terminal.

A seventh embodiment of the telecommunication system according to the invention has the characteristic that the adjustment means are provided with generating means for generating an invalid declaration signal for declaring at least a part of the registration location data invalid.

An eighth embodiment of the telecommunication system according to the invention has the characteristic that the certain data comprise clearing information, the yet further transmitting means transmitting the clearing signal to the first terminal under the control of the adjustment means.

A ninth embodiment of the telecommunication system according to the invention has the characteristic that the certain data comprise clearing information, the yet further transmitting means transmitting the clearing signal to the first terminal in response to the further information signal originating from the further transmitting means of the second terminal.

REFERENCES

The application of the IN-concept to provide mobility in underlying networks, by H. P. J. Hecker, J. Hegeman, W. R. Mol and M. J. J. van Nielen, 2nd International Conference on Intelligence in Networks (ICIN '92), Mar. 3–5, 1992, Bordeaux, France.

Universal Personal Telecommunication (UPT) Requirements on Information Flows and Protocols UPT Phase 1, European Telecommunications Standards Institute (ETSI), DRAFT, TCRTR NA-71301, Version: 0.3.3, Date: Apr. 6, 1994.

NL 9401344 (Dutch priority application)

All references are deemed to be incorporated in this patent application.

BRIEF DESCRIPTION OF THE DRAWING

The invention will be explained in greater detail by reference to an exemplary embodiment shown in the figures. In the figures.

DETAILED DESCRIPTION

Figure 1:
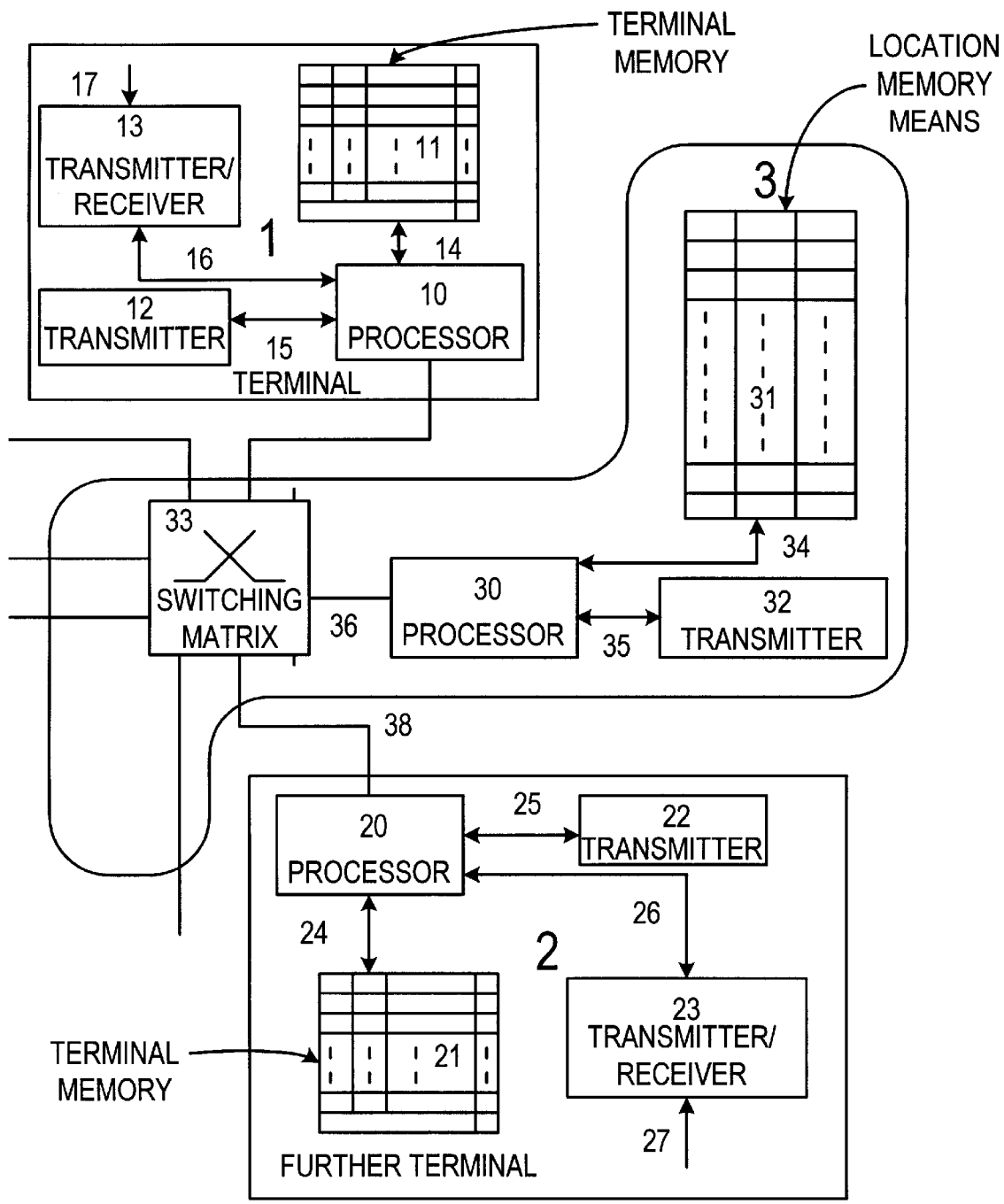
FIG. 1 shows a fixed telecommunication system according to the invention.

The fixed telecommunication system according to the invention shown in FIG. 1 comprises a terminal 1, a further terminal 2 and a network 3 designed for fixed telecommunication. Terminal 1 comprises processor means 10 which are coupled via connection 14 to a terminal memory 11 and are coupled via connection 15 to transmitting means 12 and are coupled via connection 16 to information transmitting/receiving means 13. Further terminal 2 comprises further processor means 20 which are coupled via connection 24 to a further terminal memory 21 and are coupled via connection 25 to further transmitting means 22 and are coupled via connection 26 to further information transmitting/receiving means 23. Network 3 comprises network processor means 30 which are coupled via connection 34 to location memory means 31 and are coupled via connection 35 to yet further transmitting means 32 and are coupled via connection 36 to a switching matrix 33 which is coupled via connection 37 to processor means 10 and is coupled via connection 38 to further processor means 20.

Processor means 10 and 20, respectively, control terminal memory 11 and 21, respectively, and transmitting means 12 and 22, respectively, and information transmitting/receiving means 13 and 23, respectively, and receive signals from network 3 via connection 37 and 38, respectively. The signals to be received from network 3 are converted, if necessary, by processor means 10 and 20, respectively, in the case of speech signals (from analog to digital or from digital to analog) and transmitted to loudspeaker/microphone means not shown in the figures and, in the case of signalling signals, are converted if necessary and processed further. Terminal memory 11 and 21, respectively, comprises, in this example, four columns, a first column for storing user data, a second column for storing service data, a third column for storing further data and a fourth column for storing a valid/invalid signal, and to be specific, in such a way that, per row, it is possible to store whether one user is registered for one particular service in a valid way (one particular user/service combination). At the same time, the one certain user/service combination is supplemented in greater detail by the associated further data. Transmitting means 12 and 22, respectively, transmit signalling signals to network 3 via connection 15 and 25, respectively, and via processor means 10 and 20, respectively, and via connection 37 and 38, respectively, processor means 10 and 20, respectively, being responsible in turn for any conversion and further processing. Information transmitting/receiving means 13 and 23, respectively, are formed, for example, by pushbuttons and a display, pushbutton information to be supplied being displayed symbolically via arrow 17 and 27, respectively.

Network processor means 30 control location memory means 31 and yet further transmitting means 32 and switching matrix 33. Location memory means 31 comprise, in this example, three columns, a first column for storing user data, a second column for storing service data and a third column for storing terminal location data (such as line connection data) and to be specific, in such a way that, per row, it is possible to store whether one user is registered for one service at a particular terminal location. Registration location data are then stored per row. At the same time, the one certain user/service combination does not need to be specified in greater detail per se by associated further data. Yet further transmitting means 32 transmit signalling signals via connection 35 and via processor means 30 and via switching matrix 33 to a particular terminal, processor means 30 being responsible for any conversion and further processing.

The operation of the telecommunication system according to the invention shown in FIG. 1 is as follows. A user who wishes to register himself at terminal 1 for services x and y enters consecutively via the pushbuttons of information transmitting/receiving means 13, for example, the following registration information: * id code #, * pin code #, *1 code x # y ##. Here the id code forms an identification code and the pin code forms a personal identification number code. Both are situated between an * and a # in order to mark the beginning and the end of each code. Code x forms a service x code and code y forms a service y code, an *1 marking the beginning of a service registration, a # mutually separating the two codes and a ## marking the end of the service registration. In response to this identification information and service information entered, processor means 10 receive via connection 16 signals which represent the entered information, after which processor means 10 convert the signals if necessary and pass them via connection 37, switching matrix 33 and connection 36 to network processor means 30, which check via a network memory not shown in the figures whether the combination of the pin code and the id code is correct. If this is so, network processor means 30 are supplied by the network memory not shown in the figures with further signals which represent the further data and terminal data, and network processor means transmit the further signals via connection 36, switching matrix 33 and connection 37 to processor means 10, which convert the further signals if necessary and then store the same user data (id code) in the terminal memory 11 in the first column in a first row and in a second row, the first service data (code x) in the second column in the first row, the second service data (code y) in the second column in the second row, the further data in the third column in the first row and in the second row, a valid signal in the fourth column in the first row and in the second row, and, for example, the terminal data (terminal identifier) in, the lowermost row in the terminal memory 11. Network processor means 30 store the same user data (id code) in the location memory means 31 in the first column in the first row and in the second row, the first service data (code x) in the second column in the first row, the second service data (code y) in the second column in the second row, and the same terminal location data (terminal 1) in the third column in the first row and in the second row.

The user has therefore registered himself for the service x and y at terminal 1, as a result of which a message arriving for him at network 3 and relating to service x and/or service y is routed, under the control of network processor means 30, to terminal 1 via switching matrix 33 after consulting location memory means 31. A message arriving for him at network 3 and relating to service z, on the other hand, will not be routed to terminal 1 because the user has not registered himself for the service z at terminal 1.

If the user then wishes to move from a building in which terminal 1 is situated to another building in which terminal 2 is situated and wishes to register himself at terminal 2 for the services y and z and wishes to deregister himself for the service x, he has to deregister himself at terminal 1 for the services x and y. This could be done in a simple way by entering consecutively at terminal 1 via the pushbuttons of information transmitting/receiving means 13, for example, the following information: * id code #, * pin code #, *2 code x # code y ##. Here the id code forms the identification code and the pin code the personal identification number code. Both are situated between an * and a # in order to mark the beginning and the end of each code. Code x forms the service x code and code y forms the service y code, an *2 marking the beginning of a service registration code, a # mutually separating the two codes and a ## marking the end of the service registration. In response to this identification information and service information entered, processor means 10 receive via connection 16 signals which represent the entered information, after which processor means 10 convert the signals if necessary and pass them via connection 37, switching matrix 33 and connection 36 to network processor means 30, which check, via a network memory not shown in the figures, whether the combination of the pin code and the id code is correct. If this is so, network processor means 30 are supplied by the network memory not shown in the figures with a correctness signal which represents the correctness of the combination of the pin code and the id code, and network processor means transmit the correctness signal via connection 36, switching matrix 33 and connection 37 to processor means 10, which, in response thereto, replace the valid signal in the fourth column in the first row and in the second row in the terminal memory 11 by an invalid signal. As a result, the first row and the second row of terminal memory 11 can be overwritten. Network processor means 30 replace the stored terminal location data (terminal 1) by invalid data in the third column in the first row and in the second row in location memory 31.

The user has therefore deregistered himself for the services x and y at terminal 1, as a result of which a message arriving for him at network 3 relating to service x and/or service y will no longer be routed to terminal 1 via switching matrix 33 under the control of network processor means 30 after consulting location memory means 31. If, however, the user forgets to deregister himself at terminal 1, the problem arises, firstly, that terminal memory 1 is unnecessarily provided with invalid information and the problem arises, secondly, that messages arriving for the user at network 3 relating to the services x and/or y are incorrectly routed to terminal 1. This last problem could be solved by arranging for the user to register himself at terminal 2 for the services x and y, but it is not solved in this way if the user wishes to register himself at terminal 2 for the services y and z and does not wish per se to register himself for the service x at terminal 2. The telecommunication system according to the invention solves both problems, however, in a satisfactory way, and specifically, as follows.

A user who has moved from the building containing terminal 1 to the building containing terminal 2 and wishes to register himself for the services y and z at terminal 2 and wishes to deregister himself for the service x, enters consecutively via the pushbuttons of information transmitting/receiving means 23, for example, the following registration information and clearing information: * id code #, * pin code #, *1 code y # code z #, *2 code x ##. Here the id code forms the identification code and the pin code forms the personal identification number code. Both are situated between an * and a # in order to mark the beginning and the end of each code. Code y forms a service y code and code z forms a service z code, an *1 marking the beginning of the service registration and a # separating the two codes. Code x forms a service x code, an *2 marking the beginning of a service deregistration and a ## marking the end of the service registration and the service deregistration. In response to this identification information and service information entered, processor means 20 receive via connection 26 signals which represent this entered information, after which processor means 20 convert the signals if necessary and pass them via connection 38, switching matrix 33 and connection 36 to network processor means 30, which check via a network memory not shown in the figures whether the combination of the pin code and the id code is correct. If this is so, network processor means 30 are supplied by the network memory not shown in the figures with further signals which represent the further data and terminal data, and network processor means transmit the further signals via connection 36, switching matrix 33 and connection 38 to processor means 10, which convert the further signals if necessary and then store the same user data (id code) in the terminal memory 21 in the first column in a first row and in a second row, the second service data (code y) in the second column in the first row, the third service data (code z) in the second column in the second row, the further data (mutually different or identical for each row) in the third column in the first row and in the second row, a valid signal in the fourth column in the first row and in the second row, and the terminal data (terminal identifier), for example, in the lowermost row in the terminal memory 21.

Network processor means 30 comprise adjustment means which compare the data originating from terminal 2 (which are temporarily stored, for example, in the network memory not shown in the figure) with the registration location data stored in location memory means 31, and, in doing so, establish that the user had registered himself earlier for the services x and y at terminal 1 and had not yet registered himself for the service z. In response thereto, the adjustment means replace the terminal location data stored in the third column in the first row in location memory means 31 by invalid data and the adjustment means replace the terminal location data (terminal 1) stored in the third column in the second row by other terminal location data (terminal 2) and the adjustment means again store the same user data (id code) in the first column in the third row, the third service data (code z) in the second column in the third row and the other terminal location data (terminal 2) in the third column in the third row. As a consequence of having to adjust the terminal location data stored in the third column in the first row and in the second row or as a consequence of having to adjust the terminal location data stored in the third column in the second row and the deregistration command (*2 code x ##, the clearing information, yet further transmitting means 32 generate, under the control of network processor means 30, a clearing signal which is transmitted via connection 35, network processor means 30, connection 36, switching matrix 33 and connection 37 to processor means 10 which, in response thereto, replace the valid signal in the fourth column in the first row and in the second row in the terminal memory 11 by an invalid signal. As a result, the first row and the second row of terminal memory 11 become capable of being overwritten.

The user has therefore deregistered himself in an explicit way for the service x at terminal 1 and deregistered himself in an implicit way for the service y (by further registration at terminal 2 for the service y) at terminal 1, and the user has registered himself for the services y and z at terminal 2, as a result of which a message arriving for him at network 3 relating to service y and/or service z is routed to terminal 2 via switching matrix 33 under the control of network processor means 30 after consulting location memory means 31. A message arriving for him at network 3 relating to service x will, on the other hand, no longer be routed to a terminal because the user has deregistered himself for the service x. As a result of using the clearing signal, terminal memory 11 is no longer unnecessarily provided with invalid information if the user forgets to deregister himself at terminal 1, which clearing signal is therefore generated in response to the adjustment of the terminal location data and/or in response to the deregistration command or the clearing information. The deregistration in an implicit way and in an explicit way does not in this case need to take place at the same time, but can also take place separately.

The adjustment means could be implemented in a way known to the person skilled in the art on the basis of comparison means which compare registration location data (a signal representing user data, service data and terminal location data) originating from location memory means 31 with the data (a signal representing, for example, the same user data, the same service data and other terminal location data) originating from terminal 2 and temporarily stored in the network memory not shown in the figures and on the basis of replacement means for replacing, in the case of partial equality (the identical user data and the identical service data), the terminal location data stored in location memory means 31 by the other terminal location data stored, for example, temporarily in the network memory not shown in the figures.

The yet further transmitting means 32 in network 3 could also be sited in terminal 2, in which case they could even be accommodated in further transmitting means 22. The clearing signal is then sent from terminal 2 via network 3 to terminal 1, in which case, in supplying the clearing information to terminal 2, either the user also has to add information relating to the destination of the clearing signal (terminal 1) or network 3 has to add the information relating to the destination of the clearing signal (terminal 1), for example by consulting location memory means 31. Furthermore, the clearing signal could comprise a first clearing subsignal which clears only locations in a terminal memory solely containing user data or only locations in a terminal memory containing user data and, in addition, service data and/or further data, and the clearing signal could comprise a second clearing subsignal which clears only locations in a terminal memory solely containing service data and/or further data. Of course, the terminal memory has then to be designed for this purpose in a way known to the person skilled in the art.

The terminal data (terminal identifier) stored in the lowermost row of a terminal memory are, of course, valid for every user/service combination, unless a subdivision has been made in the terminal data in order to be able to use the respective terminal in different systems. In that case, terminal data in one sense are valid for the purpose of user/service combinations for a system in one sense and terminal data in another sense are valid for the purpose of user/service combinations for a system in another sense. As long as at least one user/service combination in a particular sense is still stored, the terminal data in a particular sense therefore have to remain stored. In general, in response to at least one user/service combination in a particular sense being declared invalid in response to a clearing signal, a terminal will be able to investigate whether terminal data in a particular sense are still needed and, if this is no longer so, the terminal will also be able to declare the respective terminal data in a particular sense invalid in response to the clearing signal, which could, of course, then be communicated to the network. It is, however, also possible for the network to investigate whether terminal data in a particular sense are needed as soon as at least one user/service combination in a particular sense is declared invalid at the respective terminal and, if this is so, for the network to give an instruction for this purpose to the respective terminal by the same or another clearing signal.

A terminal could be formed, for example, by a telephone set, a video telephone set, a fax machine, a personal computer, a television set, etc. Services could comprise, for example, telephone calls, video telephone calls, data transmission, E-mail, video pictures, etc.

Figure 2:
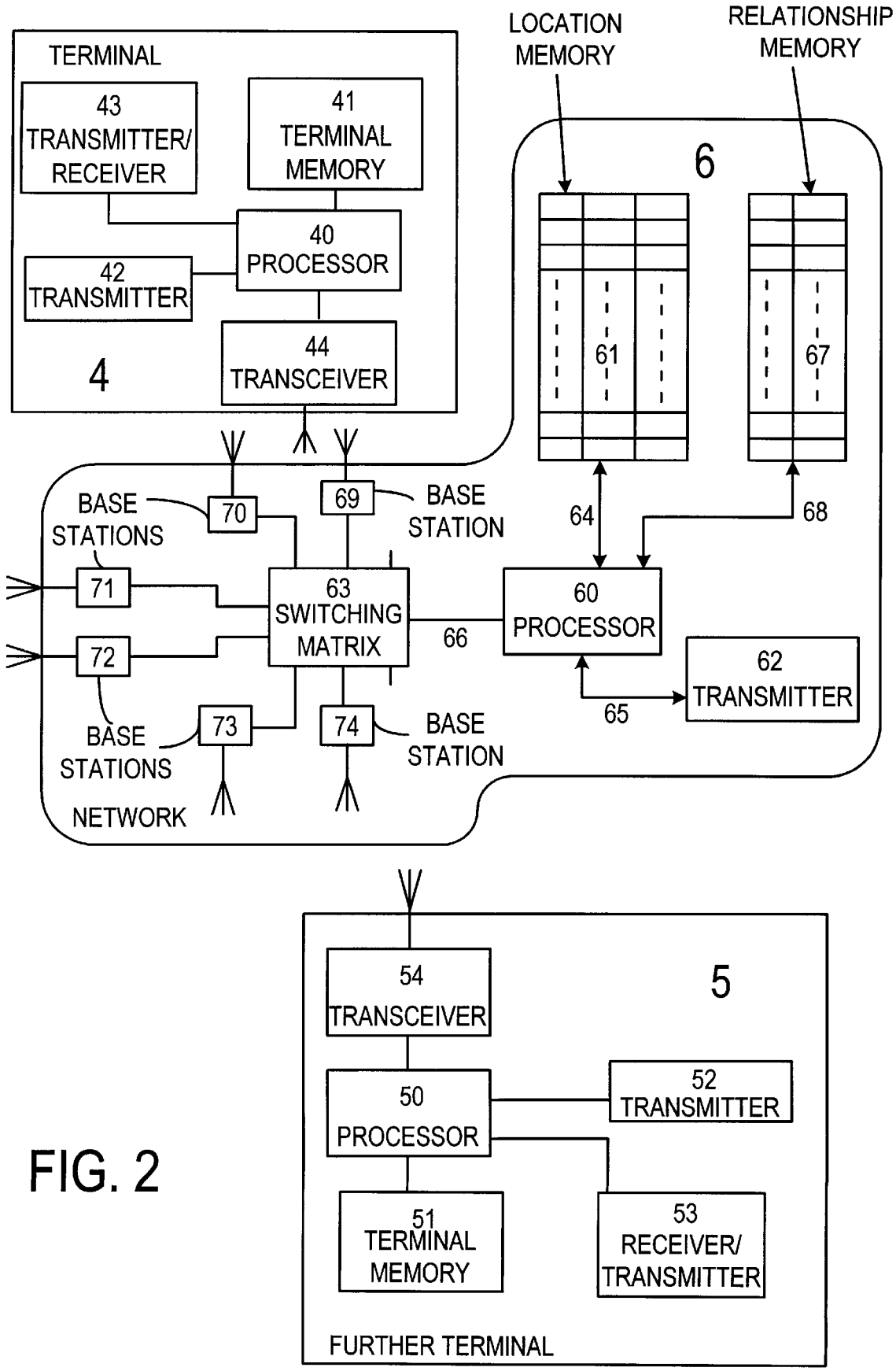
FIG. 2 shows a mobile telecommunication system according to the invention.

The mobile telecommunication system according to the invention shown in FIG. 2 comprises a terminal 4, a further terminal 5 and a network 6 designed for mobile telecommunication. Terminal 4 comprises processor means 40 which are coupled to terminal memory 41 and are coupled to transmitting means 42 and are coupled to information transmitting/receiving means 43 and are coupled to transceiver 44. Further terminal 5 comprises further processor means 50 which are coupled to a further terminal memory 51 and are coupled to further transmitting means 52 and are coupled to further information transmitting/receiving means 53 and are coupled to a further transceiver 54. Network 6 comprises network processor means 60 which are coupled via connection 64 to location memory means 61 and via connection 68 to relationship memory means 67 and are coupled via connection 65 to yet further transmitting means 62 and are coupled via connection 66 to a switching matrix 63, which is further coupled to base stations 69 and 70 (first location area), 71 and 72 (second location area), 73 and 74 (third location area).

Processor means 40 and 50, respectively, control terminal memory 41 and 51, respectively, and transmitting means 42 and 52, respectively, and information transmitting/receiving means 43 and 53, respectively, and tranceiver 44 and 54, respectively, which receives radio signals from the base stations 69, 70, 71, 72, 73 and/or 74. The signals to be received from network 6 are converted if necessary in the case of speech signals (from analog to digital or from digital to analog) by processor means 40 and 50, respectively, and transmitted, for example, to loudspeaker/microphone means not shown in the figures and, in the case of signalling signals, converted if necessary and processed further. Terminal memory 41 and 51, respectively, correspond in this example to terminal memory 11 and 21, respectively. Transmitting means 42 and 52, respectively, correspond to transmitting means 12 and 22, respectively. Information transmitting/receiving means 43 and 53, respectively, are formed, for example, by a smart card reader, it being possible for information to be supplied to the terminal via a smart card which is not shown in the figures and for information to be supplied to the smart card from the terminal.

Network processor means 60 control location memory means 61 and relationship memory means 67 and yet further transmitting means 62 and switching matrix 63. Location memory means 61 comprise, in this example, three columns, a first column for storing user data, a second column for storing service data and a third column for storing terminal data, and specifically, in such a way that it is possible to store per row whether one user is registered for one particular service at a particular terminal. Registration location data are then stored per row. Relationship memory means 67 comprise, in this example, two columns, a first column for storing terminal data and a second column for storing location area data, it thus being determined per row in which location area a terminal is situated. Yet further transmitting means 62 transmit signalling signals via connection 65 and via processor means 60 and via switching matrix 63 to a particular base station, in which process, processor means 60 could be responsible for any conversion and further processing.

The operation of the telecommunication system according to the invention shown in FIG. 2 is identical to the operation of the telecommunication system shown in FIG. 1, with the exception of the following. A user who wishes to register himself for the services x and y and z at terminal 4 accesses his smart card by means of the card reader (information transmitting/receiving means 43), as a result of which the id code (the identification code) and the service x code and the service y code and the service z code and further data codes are entered as registration information. In response to the entered identification information and service information and further information, processor means 40 receive signals which represent the entered information, after which transceiver 44 sets up a radio connection to, for example, base station 69, and processor means 40 then convert the signals if necessary and store them in terminal memory 41 and transmit them via transceiver 44 to base station 69 of network 6. Network processor means 60 store the same user data (id code) in location memory means 61 in the first column in a first row and in a second row and in a third row, the first service data (code x) in the second column in the first row, the second service data (code y) in the second column in the second row, the third service data (code z) in the second column in the third row and the same terminal data (terminal 4) in the third column in the first row and in the second row and in the third row. Furthermore, network processor means 60 store the terminal data (terminal 4) in relationship memory means 67 in a first column in a first row and location area data (first location area, as a consequence of base station 69) in a second column in the first row.

The user has therefore registered himself for the services x and y and z at terminal 4, as a result of which a message arriving for him at network 6 relating to service x and/or service y and/or service z is routed to terminal 4 via switching matrix 63 under the control of network processor means 60 after consulting location memory means 61 and relationship memory means 67. This takes place on the basis of the arriving message, first of all, by locating the terminal data via the user data in the location memory means 61 and by then locating the location area data in the relationship memory means 67 on the basis of the terminal data and by then transmitting pager signals via base stations 69 and 70 (first location area) to the transceiver 44 of terminal 4, which then sets up a radio connection to one of the base stations 69 and 70 in response thereto, etc.

If terminal 4 moves, for example, to the second location area (base stations 71 and 72), transceiver 44 then immediately sets up a radio connection to one of the base stations 71 and 72, after which network 6 is informed of the movement and the location area data in the second column in the first row of relationship memory means 67 are adjusted in a way known to the person skilled in the art. In the case of an arriving message, the terminal data are then first of all located again in the location memory means 61 via the user data and the location area data are then located in the relationship memory means 67 on the basis of the terminal data, and pager signals are then transmitted via base stations 71 and 72 (second location area) to the transceiver 44 of terminal 4 which then sets up a radio connection to one of the base stations 71 and 72 in response thereto, etc.

A user who has moved from terminal 4 to terminal 5 and wishes to register himself at terminal 5 for the services x and y and z, accesses his smart card by means of the card reader (information transmitting/receiving means 53), as a result of which the id code (the identification code) and the service x code and the service y code and the service z code and further data codes are entered as registration information. In response to the entered identification information and service information and further information, processor means 50 receive signals which represent the entered information, after which transceiver 54 sets up a radio connection to, for example, base station 74, and processor means 50 then convert the signals if necessary and store them in terminal memory 51 and transmit them via transceiver 54 and base station 74 to network 6.

Network processor means 60 comprise adjustment means which compare the data (which are stored, for example, temporarily in the network memory not shown in the figures) originating from terminal 5 with the registration location data stored in location memory means 61 and, in doing so, establish that the user had registered earlier for the services x and y and z at terminal 4. In response thereto, the adjustment means replace, in location memory means 61, the terminal data (terminal 4) stored in the third column in the first row and in the second row and in the third row by other terminal data (terminal 5). As a consequence of having to adjust the terminal data stored in the third column in the first row and in the second row and in the third row, a clearing signal is generated by yet further transmitting means 62 under the control of network processor means 60, which clearing signal is transmitted via connection 65, network processor means 60, connection 66, switching matrix 63 and base stations 69 and/or 70, for example, as a component of a pager signal to terminal 4 if it is found, after consulting relationship memory means 67, that terminal 4 is still situated in the first location area. In response to the clearing signal, the respective portion of the terminal memory 41 is cleared by terminal 4. As a result, the respective portion of terminal memory 41 becomes capable of being overwritten. As an alternative, it is possible for the clearing signal not to be transmitted as a component of the pager signal, but, after receipt of the pager signal by transceiver 44, for a radio connection to be set up to base station 69 and/or 70, after which the clearing signal is transmitted via the radio connection which has been set up.

The user has therefore deregistered himself in an implicit way for the services x and y and z at terminal 4 and he has registered himself for the services x and y and z at terminal 5, as a result of which a message arriving for him at network 6 relating to service x and/or service y and/or service z is routed to terminal 5 via switching matrix 63 and, for example, base station 74 and a radio connection which has been set up and transceiver 54 under the control of network processor means 60 after consulting location memory means 61 and relationship memory means 67, in which process the radio connection could again be effected in response to the transmission of pager signals by the base stations 73 and 74. As a result of using the clearing signal, terminal memory 41 is no longer unnecessarily provided with invalid information if the user forgets to deregister himself at terminal 4, which clearing signal is therefore generated in this case in response to the adjustment of the terminal data.

Preferably, the telecommunication system shown in FIG. 1 and the telecommunication system shown in FIG. 2 will be mutually coupled, for example by interconnecting the switching matrices 33 and 63, after which it becomes possible to deregister a user registered at terminal 1 from terminal 5 and to deregister, for example, a user registered at terminal 4 from terminal 2.

The information transmitting/receiving means 43 and 53 shown in FIG. 2, which comprise a card reader, will preferably be expanded with pushbuttons and a display so that, for example, the identification code is entered, for example, via the smart card, while the pin code is entered via the pushbuttons. In addition, there is then the possibility of entering (a portion of the) service information via the pushbuttons so that it can be determined per terminal for which services the user wishes to register himself at that terminal and/or for which services the user wishes to register himself at another terminal.

The use of a smart card and a card reader has the advantage over pushbuttons that a user has to key in less information himself. In addition, however, not only can information be read from a smart card, but additional information can also be added to the smart card. As a result, the possibility arises of storing certain terminal data relating to a first terminal on the smart card in response to a registration and/or deregistration to be performed at the first terminal so that a deregistration, to be performed from a second terminal, of services registered at the first terminal imposes less load on the network because certain terminal data relating to the first terminal are already present.

The transmitting means 12 and the further transmitting means 22 and the yet further transmitting means 32, respectively, could also be coupled directly to an outgoing connection in another exemplary embodiment so that any conversion and processing of signals could first take place by means of processor means 10 and further processor means 20 and network processor means 30, respectively, before the possibly converted and processed signals can be transmitted under the control of processor means 10 and further processor means 20 and network processor means 30, respectively. The transmitting means 42 and the further transmitting means 52 and the yet further transmitting means 62, respectively, could also be coupled directly to the transceiver 44 and transceiver 54 and switching matrix 63, respectively, in another embodiment, so that any conversion and processing of signals could first take place by means of processor means 40 and further processor means 50 and network processor means 60, respectively, before the possibly converted and processed signals can be transmitted under the control of processor means 40 and further processor means 50 and network processor means 60, respectively.

The location memory means 61 and relationship memory means 67 could be combined to form one memory having three columns, in which case the terminal data can therefore be completely omitted.

Location memory means 31 and 61 could be designed with one or more rows which are reserved for each subscribed user and which are filled with the respective data. However, they could also be designed without rows reserved for users, in which case, if terminal (location) data are replaced by invalid data in a given row in the third column, the network has to know that the entire row then becomes capable of being overwritten.

Terminal memory 11, 21, 31 and 41 and location memory means 61 could also be organized in another way, where the same user data is stored, for example, only once and the service data associated with the user data and further data then being stored via a particular address coupling.

The telecommunication system shown in FIGS. 1 and 2 are only examples. Thus, the couplings between the base stations and the switching matrix could be effected in another way (ring structure) and use could be made in network 3 and 6 of bus structures. Generally, the invention is therefore applicable in all existing and future telecommunication networks.

The invention also relates to a method for deregistering a user registered at a terminal (1, 4), via registration data, which terminal is provided with a terminal memory (11, 41) in which the registration data are stored (in the first row and in the second row of terminal memory 11, 41) in response to identification information to be entered (information transmitting/receiving means 13, 43), registration location data to be supplied to a network (3, 6) being stored in a memory field (the first row and the second row) of location memory means (31, 61) of the network (3, 6), which method is characterized in that the method comprises the steps of the supplying of certain data (via information transmitting/receiving means 23, 53) to a further terminal (2, 5) by the user, the transmission of an information signal (via further transmitting means 22, 52) to the network (3, 6) by the further terminal (2, 5) in response to the certain data to be supplied, the adjustment by the network (3, 6) of the registration location data stored in the memory field (the first row and the second row and the third row) of the location memory means (31, 61) in response to the information signal, the transmission of a clearing signal (via yet further transmitting means (32, 62) to the terminal (1, 4), and the clearing by the terminal (1, 4) of at least a portion of the terminal memory (11, 41) in response to the clearing signal.

A first embodiment of the method according to the invention has the characteristic that the registration data comprise identification data and terminal data, the identification data being stored in a first memory field (all the rows except the lowermost row) of the terminal memory (11, 41) and the terminal data being stored in a second memory field (the lowermost row) of the terminal memory (11, 41).

A second embodiment of the method according to the invention has the characteristic that the registration data comprise at least identification data, the identification data comprising user data and service data, the user data being stored in a first portion (the first column, with possibly a portion of the third column) of the first memory field and the service data being stored in a second portion (the second column, with possibly another portion of the third column) of the first memory field.

A third embodiment of the method according to the invention has the characteristic that the clearing signal comprises a first clearing subsignal for at least partially clearing the first portion of the first memory field and/or comprises a second clearing subsignal for at least partially clearing the second portion of the first memory field.

A fourth embodiment of the method according to the invention has the characteristic that the method step of adjusting the registration location data takes place by replacing at least a part of the registration location data by at least a part of further registration location data to be generated in response to the information signal (the third column, a first row and second row of location memory means 31, the third column, first row and second row and third row of location memory means 61).

A fifth embodiment of the method according to the invention has the characteristic that the certain data comprise registration information and the method step of transmitting the clearing signal takes place in response to the adjustment of the registration location data.

A sixth embodiment of the method according to the invention has the characteristic that the certain data comprise the registration information and clearing information and the method step of transmitting the clearing signal takes place in response to the supplying of the clearing information.

A seventh embodiment of the method according to the invention has the characteristic that the method step of adjusting the registration location data takes place by declaring at least a part of the registration location data invalid (invalid terminal location in the third column, first row of location memory means 31).

An eighth embodiment of the method according to the invention has the characteristic that the certain data comprise clearing information and the method step of transmitting the clearing signal takes place in response to the adjustment of the registration location data.

A ninth embodiment of the method according to the invention has the characteristic that the certain data comprise clearing information and the method step of transmitting the clearing signal takes place in response to the supplying of the clearing information.

We claim:

1. A method for deregistering a user registered at a first terminal via registration data, the first terminal being provided with a terminal memory in which the registration data is stored in response to supplied user identification information, registration location data supplied to a network being stored in a memory field of location memory means of the network, the method comprising the steps of:

supplying certain data to a second terminal by the user;

transmitting, via a second-terminal-network connection, an information signal to the network by the second terminal in response to the certain data;

adjusting, by the network, the registration location data stored in the memory field of the location memory means in response to the information signal;

transmitting, as a consequence of the information signal and via a first-terminal-network-connection, a clearing signal from the network to the first terminal; and in the first terminal and in response to the clearing signal received from the network, clearing at least a portion of the terminal memory so as to delete the registration data stored in the terminal memory.

2. The method recited in claim 1 wherein the registration data comprises identification data and terminal data, the identification data being stored in a first memory field of the terminal memory and the terminal data being stored in a second memory field of the terminal memory.

3. The method recited in claim 1 wherein the registration data comprises at least identification data, the identification data comprising user data and service data, the user data being stored in a first portion of the first memory field and the service data being stored in a second portion of the first memory field.

4. The method recited in claim 3 wherein the clearing signal comprises: a first clearing subsignal for at least partially clearing the first portion of the first memory field, a second clearing subsignal for at least partially clearing the second portion of the first memory field, or both the first and second clearing subsignals.

5. The method recited in claim 1 wherein the registration location data adjusting step comprises the step of replacing at least a part of the registration location data by at least a part of further registration location data generated in response to the information signal.

6. The method recited in claim 5 wherein the certain data comprises registration information, and the clearing signal transmitting step occurs in response to adjustment of the registration location data.

7. The method recited in claim 5 wherein the certain data comprises registration information and clearing information, and the clearing signal transmitting step occurs in response to supplying of the clearing information.

8. The method recited in claim 1 wherein the registration location data adjusting step comprises the step of declaring at least a part of the registration location data invalid.

9. The method recited in claim 8 wherein the certain data comprises clearing information, and the clearing signal transmitting step occurs in response to adjustment of the registration location data.

10. The method recited in claim 8 wherein the certain data comprises clearing information, and the clearing signal transmitting step occurs in response to supplying of the clearing information.

11. A telecommunication system comprising a first terminal, a second terminal and a network situated between and interconnecting the first and second terminals, wherein:

the first terminal has a terminal memory for storing registration data for registering a user in response to supplied user identification information and first means for transmitting, in response to the identification information, a first information signal to the network;

the network has location memory means for storing registration location data in a memory field of the location memory means in response to the first information signal;

the second terminal has second means for transmitting, in response to certain data supplied to the second terminal, a second information signal, via a second-terminal-network-connection, to the network;

the network has means for adjusting, in response to the second information signal, the registration location data already stored in the memory field of the location memory means and third means for transmitting, as a consequence of the second information signal, a clearing signal, via a first-terminal-network-connection, from the network to the first terminal; and wherein the first terminal further comprises processor means for clearing, in response to the clearing signal received from the network, a portion of the terminal memory so as to delete the registration data stored in the terminal memory.

12. The system recited in claim 11 wherein the registration data comprises identification data and terminal data, the identification data being stored in a first memory field of the terminal memory and the terminal data being stored in a second memory field of the terminal memory.

13. The system recited in claim 11 wherein the registration data comprises at least identification data, the identification data comprising user data and service data, the user data being stored in a first portion of the first memory field and the service data being stored in a second portion of the first memory field.

14. The system recited in claim 13 wherein the clearing signal comprises: a first clearing subsignal for at least partially clearing the first portion of the first memory field, a second clearing subsignal for at least partially clearing the second portion of the first memory field, or both the first and second clearing subsignals.

15. The system recited in claim 11 wherein the adjusting means comprises means for replacing at least a part of the registration location data by at least a part of second registration location data generated in response to the second information signal.

16. The system recited in claim 15 wherein the certain data comprises registration information, and the third transmitting means transmits the clearing signal to the first terminal under control of the adjusting means.

17. The system recited in claim 15 wherein the certain data comprises registration information and clearing information, and the third transmitting means transmits the clearing signal to the first terminal in response to the second information signal originating from the second transmitting means of the second terminal.

18. The system recited in claim 11 wherein the adjusting means comprises means for generating an invalid declaration signal for declaring at least a part of the registration location data invalid.

19. The system recited in claim 18 wherein the certain data comprises clearing information, and the third transmitting means transmits the clearing signal to the first terminal under the control of the adjusting means.

20. The system recited in claim 18 wherein the certain data comprises clearing information, and the third transmitting means transmits the clearing signal to the first terminal in response to the second information signal originating from the second transmitting means of the second terminal.

* * * * *